Figures 1, 2:
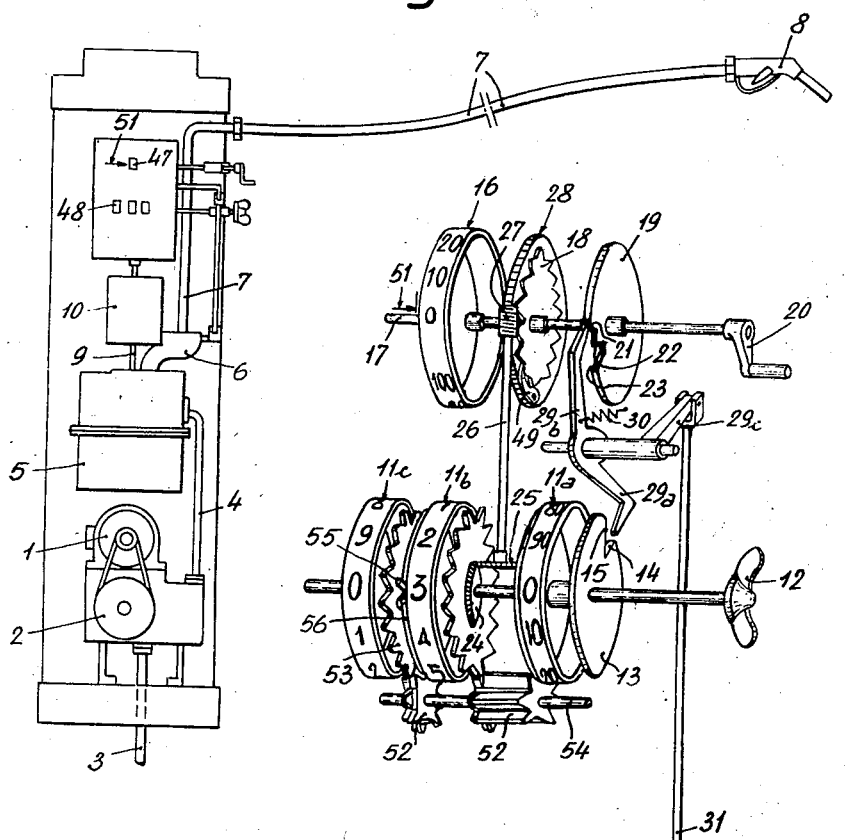

June 25, 1957  L. A. CARRIOL  2,797,025
FLUID DISTRIBUTING AND METERING INSTRUMENTS
Filed July 30, 1952

United States Patent Office 2,797,025
Patented June 25, 1957

2,797,025

FLUID DISTRIBUTING AND METERING INSTRUMENTS

Louis Auguste Carriol, Aulnay-sous-Bois, France, assignor to "S. A. T. A. M., Societe Anonyme pour Tous Appareillages Mecaniques," La Courneuve, France, a French company Application July 30, 1952, Serial No. 301,749

Claims priority, application France August 6, 1951

7 Claims. (Cl. 222—20)

The present invention relates to a fluid dispensing and metering apparatus.

More particularly, the present invention relates to a fluid dispensing and volumetric metering apparatus which incorporates a register mechanism for registering an amount corresponding to the amount of fluid delivered by the apparatus.

There exist apparatus of the above type which may be preset or preselected in such a manner that once a certain quantity of fluid is delivered, the dispensing operation is automatically stopped. In such apparatus, the preselector is controlled by that register member of the register mechanism which is of the lower denominational order. As a result, a relatively high transmission ratio is required between the register mechanism and the preselector, so that after even short use known apparatus fail to operate accurately.

It is therefore an object of the present invention to provide a fluid dispensing and metering apparatus which overcomes the above disadvantages.

It is another object of the present invention to provide a fluid dispensing and metering apparatus which is well constructed and which may be built at low cost.

The objects of the present invention also include the provision of a fluid dispensing and metering apparatus which will give long periods of trouble-free and accurate service.

With the above objects in view, the present invention mainly consists in that improvement in a fluid dispensing and metering apparatus having a volumetric metering means and conduit means for delivering an amount of fluid, which comprises a register mechanism driven by the volumetric metering means for registering an amount corresponding to the amount of fluid delivered by the conduit means, the register mechanism comprising a plurality of movable register members of different denominational orders and being interconnected for successive movement, preselector means comprising at least one movable numeral member adapted to be preset to a predetermined amount, driving means controlled by the movement of one of the register members which is of a denominational order higher than that register member which is of the lower denominational order for returning the numeral member of the preselector means to a predetermined position thereof during delivery of the fluid and for subtracting from the predetermined amount, valve means for controlling the flow of fluid through the conduit means, and operating means associated with the preselector means for actuating the valve means and for closing the valve means when the numeral member of the preselector means is returned to the predetermined position.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 shows an assembly view of a liquid distributing and metering apparatus in accordance with the present invention, and In Figure 2 a view of certain elements of this apparatus, partly in perspective, partly in section.

The apparatus shown in the drawing comprises a motor 1 which drives a pump 2, which sucks in, through a duct 3, the liquid which is in a storing tank, not shown, and forces back this liquid through the duct 4, successively into a separator 5, a valve box 6, a flexible hose 7 and a nozzle 8. During its passage, the liquid drives a metering device 10 which drives an indicator mechanism and, through it, a predeterminator mechanism.

The indicator mechanism consists here of three drums 11a, 11b and 11c. A carry over device is provided between two successive drums, and this device may be of the construction shown in French Patent No. 808,471. Here, however, the shaft 54 which carries the planet wheels 52 is guided by two windows carried by the casing and elastic devices push the planet wheels 52 on the trajectory of a side stud 55 of a cam 56 associated with the right hand drum and tend to cause them to mesh with the toothed wheel 53 associated with the lefthand drum. These may be brought back to zero by means of a knob 12, which may, for instance, be constructed as described in the above mentioned French Patent No. 808,471. The drum 11a, of a lower order (measuring centilitres, in the present case), is associated with a cam 13 comprising a notch 14 and a ramp 15.

The predeterminator mechanism consists here of a single drum 16 which is associated with a shaft 17 on which are keyed a ratchet wheel 18, a cam 19 and a control crank 20. The cam 19 comprises two notches 21 and 22 and a ramp 23.

In known apparatus, the drum 16 is connected directly with the drum of the lower order 11a. According to the present invention, however, the drum 16 is connected to the drum 11b, by a transmission incorporating the elements 24 to 28 so that a drum or register member which is of a denominational order higher than that register member of the lowest denominational order will control the drum 16. The ratio of this transmission will thus be one tenth of that which would have been necessary if it had been placed between the drums 16 and 11a.

The drum 11b is associated with a conical pinion 24, which cooperates with another conical pinion 25, keyed on a rod 26, which, on the other hand carries a worm screw 27, which meshes with a helical worm wheel 28 mounted free on the shaft 17. This wheel is against the ratchet wheel 18 and carries the axle of a pawl 49 which is in engagement with the ratchet wheel 18. The number of teeth on the wheel 18 is equal to the number of complete revolutions which must be effected by the drum 11b to rotate the drum 16 by one complete revolution. Furthermore these teeth are so arranged, with respect to the calibration carried by the drum 16 that when the pawl 49 is in its driving position and one division of the drum 16 is opposite the marking 51 of the window 47, the 00 of the drum 11a is in front of the window 48. Thus there will be perfect coordination between the passing of the numbered divisions of the drum 16 in front of the window 47, the passing of the zeroes of the drums 11a and 11b in front of the windows 48, and the passing of the numbered divisions of the drum 11c in front of the window 48.

In these conditions, the drum 16 moves by one division (from 10 to 0 for instance) each time the drum 11b effects a complete revolution. Thus the drum 16 indicates at every instant the number of litres still to be delivered.

Two arms 29a and 29b of a lever 29 cooperate, respectively with the cams 13 and 19. A spring 30 urges these arms against the peripheries of the respective cams. The lever 29 carries a third arm 29c at the end of which a rod 31 is attached. The other end of the latter is attached to an arm 32 carried by a shaft 33 which goes through the casing of the apparatus. The lower end of the shaft 33 receives the push of a spring 35 and carries an arm 34 which cooperates with the stem 36 of an auxiliary valve 37. A spring 38 keeps the rod 36 in contact with the arm 34. The lower portion of this stem 36 which comprises fins 39 slidably carries a main valve 40 which, together with a piston 41, forms a moving assembly. The piston 41 can move inside a cylindrical portion 42 of the valve box 6 and offers an effective section larger than that of the valve 40. A by-pass 43, controlled by a shutter 44 places in communication the two chambers 45 and 42 of the valve box 6 separated by the piston 41. Finally, a ring 46 serves as a seat for the valve 40.

The operation of this apparatus may be as follows:

During a delivery operation of any kind, the metering device 10 drives the indicator 11a, 11b, 11c, through the transmission 24 to 28, the pawl 49, the tip of which enters the bottom of the notch separating two teeth of the wheel 18, drives the latter and, through it, the drum 16. At the end of a delivery operation, the indicator 11a, 11b, 11c, indicates, behind the windows 48, the amount of liquid effectively delivered while the drum 16 causes the division zero to appear facing the index 51 if the amount of liquid effectively delivered is equal to the amount set, or a division corresponding to the difference of these two amounts in case the delivery has been prematurely stopped. When desiring to effect a new distribution operation, a zero setting of the indicator 11a, 11b, 11c, is first effected normally, by means of the knob 12 by turning in the direction of increase of the figures carried by the drums 11a, 11b, 11c.

Several cases should be considered:

*First case.*—This is the normal case of a complete previous distribution. The drum 16 is at zero, and since there has been delivered effectively a multiple of ten litres, the drums 11a and 11b are at zero and the drum 11c shows the number of tens of litres set and delivered. A rotation of the knob 12 in counterclockwise direction makes it possible to bring the drum 11c back to zero by causing it to move through a fraction of a turn. As to the drums 11a and 11b although they already are at zero, they effect a complete revolution during this zero setting. The lever 29 being in the notch 22 immobilizes the drum 16 in the zero position, the pawl 49 passing one tooth.

*Second case.*—There has effectively been distributed an integral number of litres, a multiple of ten but less than the amount set on the drum 16. In this case, the lever 29 is in a position similar to that shown in Figure 2, a division (ten, for instance), of the drum 16 is opposite the index 51, the drums 11a, and 11b are at zero. The return to zero of the drums 11a, 11b, 11c, will be effected in the same conditions as in the first case, but since the lever 29 is not in a notch, the rotation of the drum 11b will rotate the drum 16 and will cause it to move over one complete division. A division, which will not necessarily be zero, will come in front of the index 51.

*Third case.*—There has effectively been distributed an integral number of liters, but not a multiple of ten and lower than the amount set on the drum 16. No division of the latter is opposite the index 51. In this case, the drum 11a is at zero; the drums 11b and 11c, however, indicate the number of litres effectively delivered. When the knob 12 is turned, the drum 11a makes one complete revolution, the drum 11b rotates by a number of tenths of one revolution equal to the difference between the integral number of litres effectively delivered and the number corresponding to the next higher ten litres. This amounts for the indicator and predeterminator only to completing artificially the amount of liquid delivered to the next higher ten litres. Thus, for instance, the indicator reads three litres, the drum 11b will be turned as if the effective delivery has been ten litres. As the drum 11b turns, it drives the transmission 24—28, the pawl 49, the wheel 18 and the drum 16. One division of the latter (which is not necessarily the zero division) thus comes opposite the index 51.

*Fourth case.*—A fractional number of litres has effectively been delivered. In such a case, none of the drums 11a and 16 is at zero. The rotation of the drum 11a is without any direct action on the drum 16. The rotation of the drum 11b, as indicated in the third case, brings back the drum 16 to such a position that one of the divisions of the latter is opposite the index 51. The rotation of the drum 11c, should it occur, does not affect the drum 16.

Thus whatever the case considered, the return to zero of the drums 11a, 11b, 11c, is obtained by a rotation of the knob 12 by one turn, and such a rotation makes it possible to bring the drum 16 to such a position that one division thereof is opposite the index 51.

After the zero setting operation, the drum 16 is set to the new amount of liquid to be delivered. To this end, the crank 20 is turned in one or the other direction, so as to cause the number of litres it is desired to be delivered to appear behind the window 47. The first effect of this rotation of the crank is to turn the wheel 18, but the latter cannot drive the pawl 49 as the latter is associated with the wheel 28, which is locked by the screw 27.

The pawl 49 will thus ride over the teeth of the wheel 18. At the end of the setting, the end of the pawl 49 will be at the bottom of one notch in the wheel 18, since each tooth corresponds to a rotation of the drum 16 equal to that which is necessary for causing the passage, in front of the index 51, of the interval separating two successive divisions of the drum 16. Now, precisely, the number of litres to be delivered being a multiple of 10 and the number indicated by the drum 16 being equal to zero or to a multiple of ten, the difference between these two numbers is a multiple of ten. Thus, from the very beginning of the rotation of the drum 11b, the pawl 49 will be ready for driving the ratchet wheel 18 and consequently the drum 16.

If the latter had not had one of its divisions opposite the index 51 at the time of the setting, which will result after an incomplete previous distribution, the end of the pawl 49 would have been placed no longer in a notch but on the tip of a tooth and the rotation of the drum 11b, during the new distribution, would have been effective, at the beginning, to push the end of the pawl 49 in the notch separating two successive teeth of the wheel 18, and this without causing a rotation of the drum 16, in such a manner that the latter would cause a stopping of the apparatus for an amount of liquid effectively delivered higher than the amount which has been set. This shows the necessity for bringing the drum 16, before setting, in such a position that one of its divisions be opposite the index 51 and consequently the necessity for resetting the drum 11b to zero when this is not at the end of a distribution.

It will be seen from the above that a correct zero setting of the drums 11a, 11b, ensures a correct position of the drum 16 for a new setting, whatever may be the position of the drum 16 at the end of the previous distribution and, consequently, a correct stopping of the new operation of distribution.

The rotation of the cam 19 during the setting of the drum 16, if the arm 29b is in the notch 22, has the effect of pushing it back in spite of the action of the spring 30, owing to the presence of the ramp 23. This triggering of the lever 29 has the effect of lifting the rod 31. The lifting of the rod 31 resulting therefrom causes a toppling of the arm 32, a rotation of the rod 33 and a rotation of the lever 34 which pushes the rod 36 downwards. The valve 37 against the action of the spring 38, uncovers the bore 50. As soon as the pump 1 is operating and the valve of the nozzle 8 is open, the liquid, forced back by the pump 2 goes through the by-pass 43, the delivery of which has been set once and for all by the needle valve 44, the chamber 42, the bore 50 and the flexible hose 7.

The delivery is thus effected at a low speed. Consequently, the difference between the pressures obtaining on the two faces of the piston 41 will increase. At a given moment, the valve 40 moves away from its seat 46 and the liquid flows at a higher speed.

Due to this toppling of the arm 29b, the arm 29a is then disengaged from the notch 14 of the cam 13 and does not oppose the rotation of the latter. The delivery taking place; the metering element drives the drum 11a and the cam 13.

When the calibration 90 of the drum 11a is replaced by the calibration 00 behind the window 48, it causes the advance of the drum 11b from the zero division to the division one behind the window 48, which causes the rotation, in the direction of decreasing figures, the drum 16 by one tenth of one division, as explained above. At that time, the notch 14 passes in front of the tip of the lever 29a but the latter cannot fall therein since the lever 29b is held in position by the periphery of the cam 19 and the delivery continues at the same rate.

About one litre before the end of the distribution, the fall of the lever 29b, connected through the rod 31 with the elements for stopping the liquid takes place in the first notch 21 of the cam 19 upon the drum 11b passing from 8 to 9.

This toppling of the lever 29 causes a downward motion of the rod 31 and allows the auxiliary valve 37 to come, under the action of the spring 38 on the seat formed by the main valve 40. The latter closes slightly, but the auxiliary valve 37, under the action of the spring 38 follows the valve 40 until its displacement is limited by the stop 34. The valve 40 is then closed and the delivery is effected slowly through the by-pass only.

From that moment, the last litre is delivered slowly and between the following 90 and 00 on the drum 11a, the notches 22 and 14 of the cam 13 arrive under the ends of the lever 29b, the notch 22 having a slight advance on the notch 14 and the latter appearing very exactly at the zero of the part sum.

At that time, the ends of the lever fall into the two notches and, through the rod 31, act on the stopping system for the liquid. The distribution is ended, the auxiliary valve then resting against the seat formed by the main valve 40.

It should be noted that the above described device offers numerous advantages with respect to the similar known devices in which the transmission 24 to 28 derives its motion directly from the drum 11a. To this effect, the ratio of the transmission in the known devices is ten times smaller than that of the transmission of the above described device, everything else being equal.

Consequently, an error of one minute of a degree on the angular position of the notch 22 of the cam 19 (due to wear, for instance) corresponds, in the case of the device described, to an error of 12 minutes on the drum 11b (assuming the ratio of the transmission between 11b and the cam 19 to be one twelfth) and, in the case of the known devices, to an error of one hundred and twenty minutes on the drum 11a. Now, in the above described device, the drum 11a drives the drum 11b during the operating of the carry-over device 52—54 with a ratio equal to unity. Thus, in the case of the applicant's device, the error on 11a is equal to that on 11b, i. e. twelve minutes of one degree, i. e. ten times lower than that obtained in devices known at present.

It should also be noted that the present invention is not limited to the example described and represented. Thus, for example, the number of teeth on the wheel 18 may be not equal, but an integer multiple other than one, of the number of rotations of the drum 11b, necessary for causing the drum 16 to go through an entire revolution. If, for instance, this multiple is 5 (five) everything will take place as if the drum 16 were calibrated in two-litre steps.

What is claimed is:

1. In a fluid dispensing and metering apparatus having a volumetric metering means and conduit means for delivering an amount of fluid, in combination, a register mechanism driven by the volumetric metering means for registering an amount corresponding to the amount of fluid delivered by said conduit means, said register mechanism comprising a plurality of movable register members of different denominational orders and being interconnected for successive movement; preselector means comprising at least one movable numeral member adapted to be preset to a predetermined amount; driving means controlled by the movement of one of said register members which is of a denominational order higher than that register member which is of the lowest denominational order for returning said numeral member of said preselector means to a predetermined position thereof during delivery of the fluid and for subtracting from said predetermined amount; valve means for controlling the flow of fluid through the conduit means; and operating means associated with said preselector means for actuating said valve means and for closing said valve means when said numeral member of said preselector means is returned to said predetermined position.

2. In a fluid dispensing and metering apparatus having a volumetric metering means and conduit means for delivering an amount of fluid, in combination, a register mechanism driven by the volumetric metering means for registering an amount corresponding to the amount of fluid delivered by said conduit means, said register mechanism comprising a plurality of rotatable register wheels of different denominational orders and being interconnected for successive movement; preselector means comprising at least one rotatable numeral wheel adapted to be preset to a predetermined amount and being of a denominational order higher than that of the register wheel of lowest denominational order; driving means controlled by the movement of one of said register wheels of a denominational order higher than the register wheel of lowest denominational order for returning said numeral wheel of said preselector means to a predetermined position thereof during delivery of the fluid and for subtracting from said predetermined amount, said one register wheel being turned at intervals during driving of said register mechanism by said volumetric metering means, said driving means being connected to said one register wheel for movement at intervals at the same rate as said one register wheel; valve means for controlling the flow of fluid through the conduit means; and operating means associated with said preselector means for actuating said valve means and for closing said valve means when said numeral wheel of said preselector means is returned to said predetermined position.

3. In a fluid dispensing and metering apparatus having a volumetric metering means and conduit means for delivering an amount of fluid, in combination, a register mechanism driven by the volumetric metering means for registering an amount corresponding to the amount of fluid delivered by said conduit means, said register mechanism comprising a plurality of rotatable register wheels of different denominational orders and being interconnected for successive movement; preselector means comprising at least one rotatable numeral wheel adapted to be preset to a predetermined amount and being of a denominational order higher than that of the register wheel of lowest denominational order; driving means controlled by the movement of one of said register wheels of a denominational order higher than the register wheel of lowest denominational order for returning said numeral wheel of said preselector means to a predetermined position thereof during delivery of the fluid and for subtracting from said predetermined amount, said driving means comprising connecting means providing for connection of said preselector means with said one register wheel for movement of said numeral wheel in a direction for returning said numeral wheel to said predetermined position and for disconnecting said preselector means and said one register wheel when said numeral wheel is moved in the opposite direction for presetting the same; valve means for controlling the flow of fluid through the conduit means; and operating means associated with said preselector means for actuating said valve means and for closing said valve means when said numeral wheel of said preselector means is returned to said predetermined position.

4. In a fluid dispensing and metering apparatus having a volumetric metering means and conduit means for delivering an amount of fluid, in combination, a register mechanism driven by the volumetric metering means for registering an amount corresponding to the amount of fluid delivered by said conduit means, said register mechanism comprising a plurality of rotatable register wheels of different denominational orders and being interconnected for successive movement; preselector means comprising at least one rotatable numeral wheel adapted to be preset to a predetermined amount and being of a denominational order higher than that of the register wheel of lowest denominational order; driving means controlled by the movement of one of said register wheels of a denominational order higher than the register wheel of lowest denominational order for returning said numeral wheel of said preselector means to a predetermined position thereof during delivery of the fluid and subtracting from said predetermined amount, said driving means comprising connecting means providing for connection of said preselector means with said one register wheel for movement of said numeral wheel in a direction for returning said numeral wheel to said predetermined position and for disconnecting said preselector means and said one register wheel when said numeral wheel is moved in the opposite direction for presetting said numeral wheel, said connecting means including a ratchet wheel having a plurality of teeth and connected to said numeral wheel for turning said numeral wheel and a gear wheel connected to said one register wheel and having a pawl in engagement with said ratchet wheel, the number of teeth on said ratchet wheel being a multiple of the number of revolutions of said one register wheel necessary for producing one revolution of said numeral wheel of said preselector means; valve means for controlling the flow of fluid through the conduit means; and operating means associated with said preselector means for actuating said valve means and for closing said valve means when said numeral wheel of said preselector means is returned to said predetermined position.

5. In a fluid dispensing and metering apparatus having a volumetric metering means and conduit means for delivering an amount of fluid, in combination, a register mechanism driven by the volumetric metering means for registering an amount corresponding to the amount of fluid delivered by said conduit means, said register mechanism comprising a plurality of rotatable register wheels of different denominational orders and being interconnected for successive movement; preselector means comprising at least one rotatable numeral wheel adapted to be preset to a predetermined amount and being of a denominational order higher than that of the register wheel of lowest denominational order; driving means controlled by the movement of one of said register wheels of a denominational order higher than the register wheel of lowest denominational order for returning said numeral wheel of said preselector means to a predetermined position thereof during delivery of the fluid and for subtracting from said predetermined amount, said driving means comprising a worm gear connected to and turnable by said one register wheel, a ratchet wheel connected to and coaxial with said numeral wheel for turning the same, and a helical gear wheel engaging said worm gear so as to be turnable thereby, said helical gear having a pawl engaging said ratchet wheel for turning the same; valve means for controlling the flow of fluid through the conduit means; and operating means associated with said preselector means for actuating said valve means and for closing said valve means when said numeral wheel of said preselector means is returned to said predetermined position.

6. In a fluid dispensing and metering apparatus having a volumetric metering means and conduit means for delivering an amount of fluid, in combination, a register mechanism driven by the volumetric metering means for registering an amount corresponding to the amount of fluid delivered by said conduit means, said register mechanism comprising a plurality of rotatable register wheels of different denominational orders and being interconnected for successive movement; preselector means comprising at least one rotatable numeral wheel adapted to be preset to a predetermined amount and being of a denominational order higher than that of the register wheel of lowest denominational order; driving means controlled by the movement of one of said register wheels of a denominational order higher than the register wheel of lowest denominational order for returning said numeral wheel of said preselector means to a predetermined position thereof during delivery of the fluid and for subtracting from said predetermined amount; valve means for controlling the flow of fluid through the conduit means; and operating means comprising cam means turnable with said preselector means and lever means coacting with said cam means and connected to said valve means for actuating said valve means and for closing said valve means when said numeral wheel of said preselector means is returned to said predetermined position.

7. In a fluid dispensing and metering apparatus having a volumetric metering means and conduit means for delivering an amount of fluid, in combination, a register mechanism driven by the volumetric metering means for registering an amount corresponding to the amount of fluid delivered by said conduit means, said register mechanism comprising a plurality of movable register members of different denominational orders and being interconnected for successive movement; preselector means comprising only one movable numeral member adapted to be preset to a predetermined amount; driving means controlled by the movement of that one of said register members of a denominational order next higher than the register member of lowest denominational order for returning said numeral member of said preselector means to a predetermined position thereof during delivery of the fluid and for subtracting from said predetermined amount; valve means for controlling the flow of fluid through the conduit means; and operating means associated with said preselector means for actuating said valve means and for closing said valve means when said numeral member of said preselector means is returned to said predetermined position.

References Cited in the file of this patent
UNITED STATES PATENTS

| | | |
|---|---|---|
| 2,228,820 | Griffith et al. | Jan. 14, 1941 |
| 2,336,383 | Alexander | Dec. 7, 1943 |
| 2,527,677 | Hazard | Oct. 31, 1950 |
| 2,527,703 | Carbonaro | Oct. 31, 1950 |
| 2,634,884 | Bliss | Apr. 14, 1953 |